(12) United States Patent
Bourret

(10) Patent No.: US 7,812,857 B2
(45) Date of Patent: Oct. 12, 2010

(54) EDGE ANALYSIS IN VIDEO QUALITY ASSESSMENT

(75) Inventor: Alexandre Bourret, Ipswich (GB)

(73) Assignee: British Telecommunications plc, London (GB)

( * ) Notice: Subject to any disclaimer, the term of this patent is extended or adjusted under 35 U.S.C. 154(b) by 1242 days.

(21) Appl. No.: 10/558,673

(22) PCT Filed: Jun. 4, 2004

(86) PCT No.: PCT/GB2004/002400

§ 371 (c)(1),
(2), (4) Date: Nov. 30, 2005

(87) PCT Pub. No.: WO2004/114216

PCT Pub. Date: Dec. 29, 2004

(65) Prior Publication Data

US 2006/0274618 A1   Dec. 7, 2006

(30) Foreign Application Priority Data

Jun. 18, 2003  (GB) ................................. 0314162.9

(51) Int. Cl.
*H04N 17/00* (2006.01)
*G06K 9/48* (2006.01)

(52) U.S. Cl. ..................... 348/180; 348/177; 348/192; 382/199

(58) Field of Classification Search ................ 348/177, 348/180, 192, 193
See application file for complete search history.

(56) References Cited

U.S. PATENT DOCUMENTS

| 5,126,990 | A | | 6/1992 | Efron et al. |
| 5,446,492 | A | * | 8/1995 | Wolf et al. ................... 348/192 |
| 5,596,364 | A | * | 1/1997 | Wolf et al. ................... 348/192 |
| 5,838,828 | A | * | 11/1998 | Mizuki et al. ................ 382/236 |
| 6,434,275 | B1 | * | 8/2002 | Fukuda et al. ............... 382/275 |
| 6,493,023 | B1 | | 12/2002 | Watson |
| 6,496,221 | B1 | * | 12/2002 | Wolf et al. ................... 348/192 |
| 6,577,764 | B2 | * | 6/2003 | Myler et al. ................. 382/228 |
| 6,822,675 | B2 | * | 11/2004 | Jung et al. ................... 348/180 |

(Continued)

FOREIGN PATENT DOCUMENTS

EP       0556030 A1    8/1993

(Continued)

OTHER PUBLICATIONS

International Search Report—Aug. 23, 2004.

(Continued)

*Primary Examiner*—Brian P Yenke
(74) *Attorney, Agent, or Firm*—Nixon & Vanderhye PC

(57) ABSTRACT

Edge detector techniques, known per se in the art, are applied to the field of automated video quality assessment. Any known edge detection algorithm is used as the basis of an edge detection stage for performing edge analysis of test video fields/frames in order to generate an edge parameter value that can then be used to contribute to an overall video quality value. The use of an edge detector stage contributes valuable information concerning image attributes which are perceptually significant to a human viewer to the quality assessment, thus rendering the result provided by the automated assessment more similar to that which would be performed by a human viewer undertaking a subjective assessment.

7 Claims, 8 Drawing Sheets

U.S. PATENT DOCUMENTS

| | | | |
|---|---|---|---|
| 7,099,518 B2 * | 8/2006 | Li et al. | 382/255 |
| 7,199,819 B2 * | 4/2007 | Sugimoto et al. | 348/192 |
| 2001/0024515 A1 * | 9/2001 | Martins et al. | 382/107 |
| 2003/0133624 A1 | 7/2003 | Dantwala | |
| 2004/0012675 A1 * | 1/2004 | Caviedes | 348/180 |
| 2004/0175056 A1 * | 9/2004 | Lee | 382/286 |
| 2006/0152585 A1 | 7/2006 | Bourret | |

FOREIGN PATENT DOCUMENTS

| | | |
|---|---|---|
| EP | 0940996 A1 | 9/1999 |
| EP | 0977446 A3 | 10/2001 |
| EP | 1289318 A1 | 3/2003 |
| WO | WO 00/48407 | 8/2000 |
| WO | 2004/114215 A2 | 12/2004 |

OTHER PUBLICATIONS

GB Search Report—Nov. 28, 2003.

Hekstra et al., "PVGM—A Perceptual Video Quality Measure", Signal Processing:Imaging Communications, 17 (2002), 781-798.

Wolf, "Features for Automated Quality Assessment of Digitally Transmitted Video", NTIA Report 90-264, U.S. Department of Commerce, 'Online! Jun. 1990, pp. 1-82, XP002293368.

Pinho et al., "Figures of Merit for Quality Assessment of Binary Edge Maps", Proceedings of the International Conference on Image Processing (ICIP) Lausanne, Sep. 16-19, 1996, New York, IEEE, US, vol. 1, pp. 591-594, XP010202463.

Pinho et al., "On the Partition of Binary Edge Maps as a first Step for Quantitative Quality Evaluation", Proceedings of the International Conference on Image Processing (ICIP) Lausanne, Sep. 16-19, 1996, New York, IEEE, US, vol. 1, pp. 343-346, XP010202401.

Fu-Huei Lin et al., "Quality Measure Based Approaches to MPEG Encoding", Proceedings of the International Conference on Image Processing (ICIP) Lausanne, Sep. 16-19, 1996, New York, IEEE, US, vol. 1, pp. 323-326, XP010202396.

International Search Report dated Dec. 22, 2004, re PCT/GB2004/002384.

Wolf, et al, "Objective Quality Assessment of Digitally Transmitted Video," Processing 1991, IEEE Pacific Rim Conference on Communications, Computers and Signal Processing, Victoria, BC, Canada (May 9-10, 1991), New York, NY, USA, IEEE, US (May 9, 1991), pp. 477-482.

Tektronix MBD: "Applications—Picture Quality Guide: Picture Quality Testing," 11 pages (Oct. 2003).

Tektronix: "Measuring and Interpreting Picture Quality in MPEG Compressed Video Content, A New Generation of Measurement Tools," www.tektronix.com/video_audio, 6 pages.

Tektronix: "Products—Picture Quality Analysis System—PQA300: Introduction," 5 pages (Oct. 2003).

ITU-R BT.500-11, "Methodology for the Subjective Assessment of the Quality of Television Pictures," 48 pages. (2002).

* cited by examiner

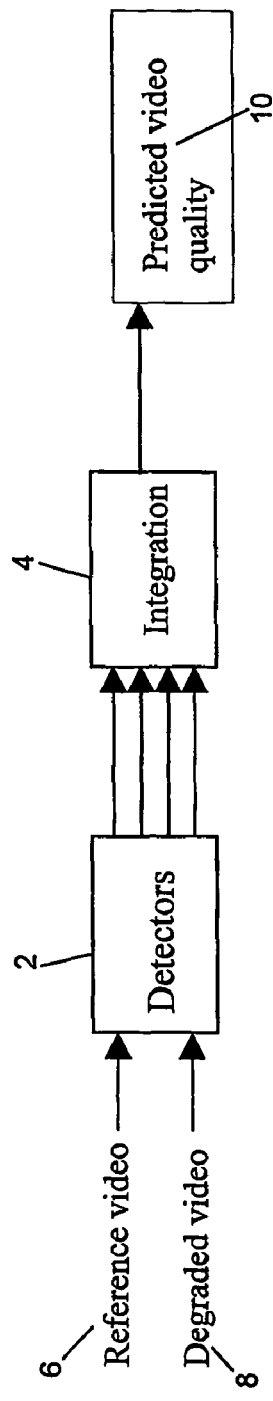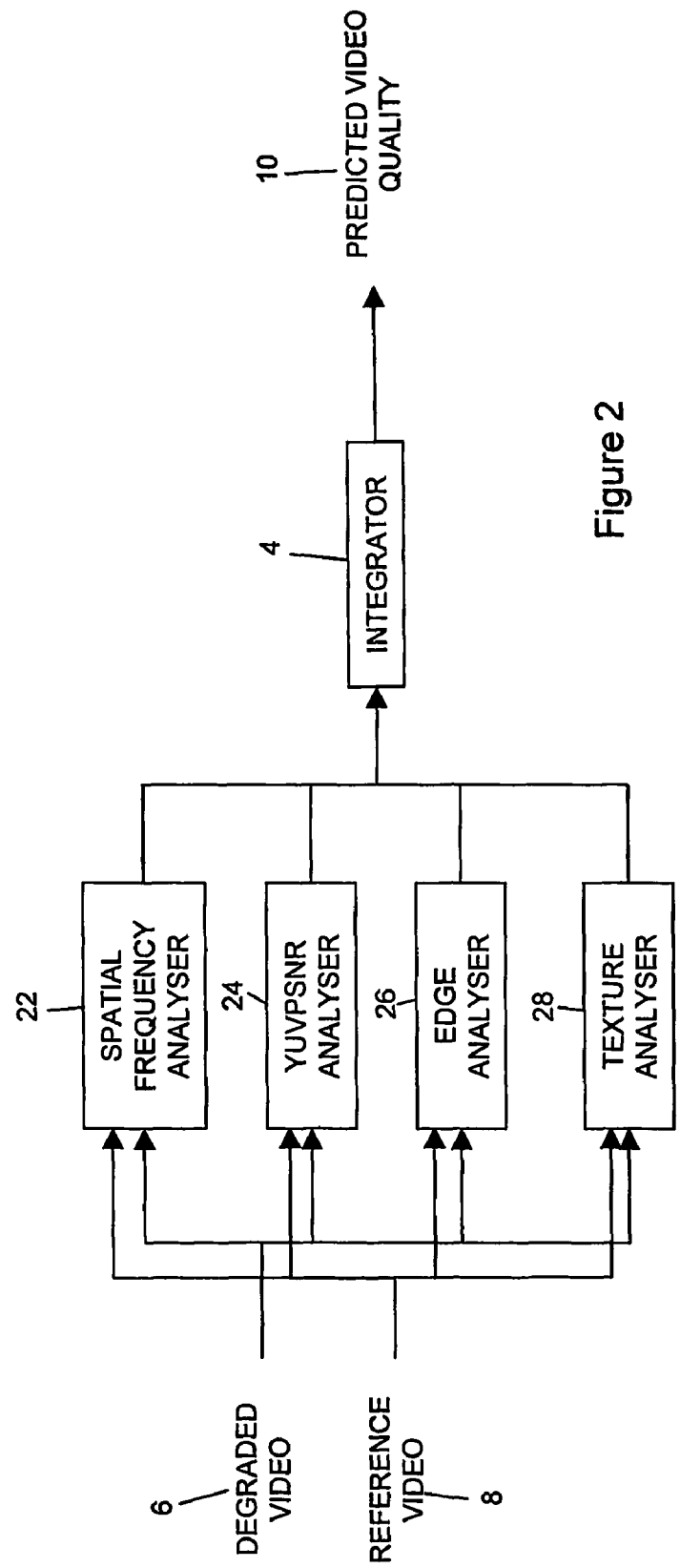

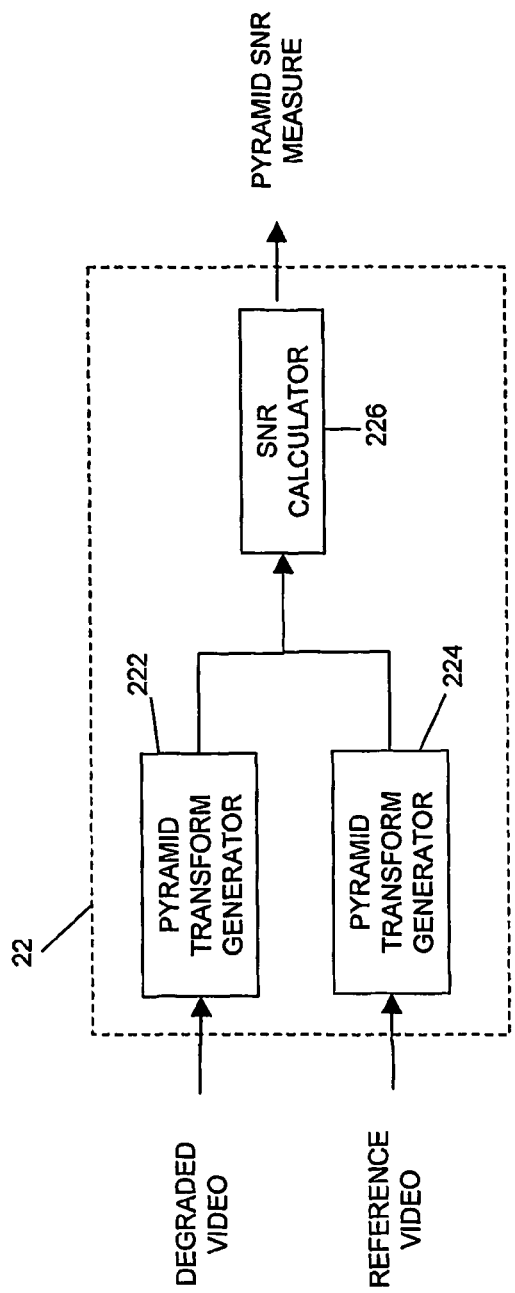
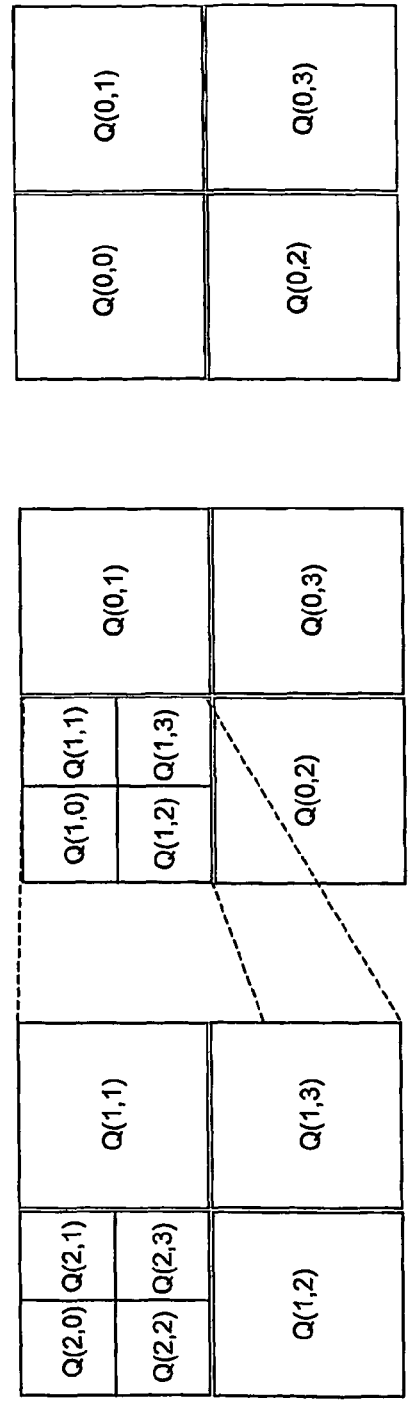
Figure 3
Figure 4

EDGE ANALYSIS IN VIDEO QUALITY ASSESSMENT

This application is the US national phase of international application PCT/GB2004/002400 filed 4 Jun. 2004 which designated the U.S. and claims benefit of GB 0314162.9, dated 18 Jun. 2003, the entire content of which is hereby incorporated by reference.

BACKGROUND

1. Technical Field

The present invention relates to a method and system for performing automated video quality assessment, and in particular to such a method and system employing an edge analysis technique.

2. Related Art

Video quality assessment techniques employing human viewers are long known in the art, and are described in CCIR Rec. 500 (ITU-R BT.500 "Methodology for the Subjective Assessment of the Quality of Television Picture"). Automated video quality assessment techniques are also known in the art. An example of a prior art system that provides for automated video quality assessment is the PQA 300, available from Tektronix Inc., of Beaverton, Oreg., US. The PQA 300 compares a test video sequence produced from a system under test with a corresponding reference sequence, and produces a picture quality rating, being a quantitative value indicative of the quality of the test video sequence. In order to produce the picture quality rating the PQA 300 performs spatial analysis, temporal analysis, and full-colour analysis of the test sequence with respect to the reference sequence.

It is also known within the art to provide for edge-detection within images, and many edge detention algorithms are known within the art that may be applied to images. Examples of known edge detection algorithms are Laplacian edge detectors, Canny edge detectors, and Rothwell edge detectors. Source code in the C programming language for a Canny edge detector was available for free download via ftp before the priority date from figment.csee.usf.edu/pub/Edge_Comparison/sourcecode/canny.serc. whereas source code in C for a Rothwell edge detector was available from figment.csee.usf.edu/pub/Edge_Comparison/source code/rothwell.src.

BRIEF SUMMARY

The present exemplary embodiment applies edge detector techniques as are known per se in the art of image processing to the field of automated video quality assessment by providing a method of and system for video quality assessment which employs any known edge detection algorithm as the basis of an edge detection stage for performing edge analysis of test video fields/frames in order to generate an edge parameter value that can then be used to contribute to an overall video quality value. The use of an edge detector stage contributes valuable information concerning image attributes which are perceptually significant to a human viewer to the quality assessment, thus rendering the result provided by the automated assessment more similar to that which would be performed by a human viewer undertaking a subjective assessment.

In view of the above, from a first aspect there is provided a video quality assessment method comprising the steps of:

generating respective edge maps for a reference video field/frame and a test video/frame;

generating data relating to edges contained within the respective edge maps; and using the generated data to produce a video quality measurement value.

The invention of the first aspect therefore employs edge detection techniques within a video quality assessment method, thereby improving the result obtained by such a method with respect to results obtained from human subjective testing of the same test sequences.

In a preferred embodiment, the generating data step further comprises generating data relating to edges contained within corresponding sub-field/frame elements of the respective edge maps. This solves a problem with edge extraction algorithms in that they are sensitive to the noise and degradation that can occur in an image, and can produce mismatches in the results. In particular, smoothing effects in the test sequence can end up in the extracted edge being displaced when compared with the extracted edge in the reference signal. For this reason, a direct pixel comparison of edge maps may lead to an erroneous video quality assessment value, even though such smoothing effects would most likely go unnoticed by a human viewer performing a subjective video quality assessment.

Moreover, within the preferred embodiment the generating data steps further comprise:

counting edge pixels within the sub-elements of the test and reference fields/frames;

determining respective difference values between respective counts of corresponding sub-field/frame elements in the test and reference fields/frames; and generating an edge parameter value in dependence on the difference values.

Thus a comparison of sub-field/frame elements of the test and reference signals is performed, and an edge parameter value derived which is indicative of differences between the respective sub-field/frame elements. The edge parameter value can then be used directly as a single value indicative of the edge data to produce the final video quality assessment value.

Preferably, within the preferred embodiment the using step further comprises integrating the edge parameter value with other parameter values derived from other analysis techniques, to give the video quality value. The other analysis techniques may preferably include any one or more of a spatial analysis, a temporal analysis, and/or a texture analysis.

Preferably, the integrating step comprises weighting the parameter values in accordance with pre-determined weighting values, and summing the weighted values, wherein the resulting sum is the video quality value.

From a second aspect the present invention also provides a video quality assessment system comprising:

edge map generating means arranged in use to generate respective edge maps for a reference video field/frame and a test video/frame;

edge map analysis means arranged in use to generate data relating to edges contained within the respective edge maps; and video quality value determining means arranged in use to use the generated data to produce a video quality measurement value.

Within the second aspect the same advantages as previously described in respect of the first aspect are obtained. Additionally, the same further features and advantages may also be provided.

From a third aspect, the present invention further provides a computer program or suite of programs so arranged such that when executed by a computer system it/they cause/s the system to perform the method of the first aspect.

Additionally, from a yet further aspect the invention also provides a computer readable storage medium storing a computer program or at least one of suite of computer programs according to the third aspect. The computer readable storage medium may be any magnetic, optical, magneto-optical, solid-state, or other storage medium capable of being read by a computer.

BRIEF DESCRIPTION OF THE DRAWINGS

Further features and advantages of the present invention will become apparent from the following description of an embodiment thereof, presented by way of example only, and by reference to the accompanying drawings, wherein like reference numerals refer to like parts, and wherein:

FIG. 1 is a system block diagram illustrating the components of the embodiment of the invention, and the signal flows therebetween;

FIG. 2 is a system block diagram illustrating in more detail the various detector modules used in the embodiment of the invention;

FIG. 3 is a block diagram of the spatial analyser of the embodiment of the invention;

FIG. 4 illustrates the pyramid arrays generated by the spatial analyser within the embodiment of the invention;

DETAILED DESCRIPTION OF EXEMPLARY EMBODIMENTS

Figure 5:
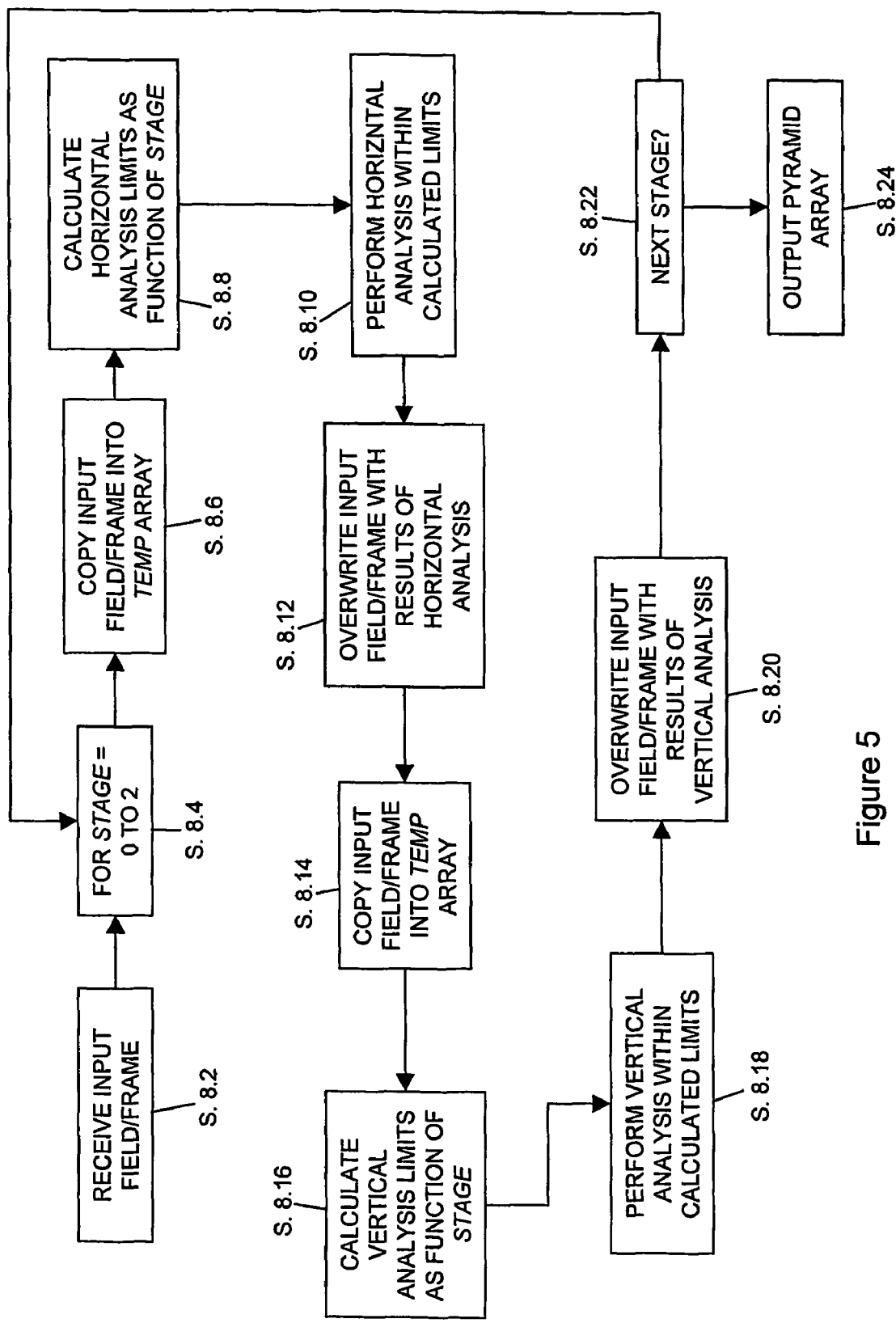
FIG. 5 is a flow diagram illustrating the generation of a pyramid array within the embodiment of the invention.

Embodiments of the invention will now be described.

FIG. 1 illustrates an overall system block diagram of the general arrangement of the embodiments of the invention. Within FIG. 1 a reference sequence comprising reference sequence fields/frames 6 is input to a detector module 2. Similarly, a test sequence of video fields/frames 8 (interchangeably referred to herein as either the test sequence, or the degraded sequence) is also input in to the detector module 2. The test sequence is obtained by inputting the reference sequence to a system to be tested (such as a video recording device, a broadcast system, or a video codec, for example), and then taking the output of the system under test as the test sequence. The detector module 2 acts to detect various video characteristics of the input reference and test video fields/frames and generates video characteristic values which are then output to an integration module 4. The integration module 4 integrates the video characteristics values together to give a predicted video quality value 10, which is output therefrom.

FIG. 2 illustrates in more detail the arrangement of the embodiments of the invention. Here it will be seen that the reference and test video sequences are each input to four analysers, being a spatial frequency analyser 22, a luminance and chrominance power signal to noise ratio analyser 24, an edge analyser 26, and a texture analyser 28. The respective analysers act to generate various video characteristic values as a result of the respective forms of analysis which each performs, and the video characteristic values are input to an integration module 4. The integration module then combines the individual video characteristic values to generate a video quality value PDMOS 10, which is a quantitative value relating to the test video quality as assessed by the embodiment of the invention.

Returning now to a brief consideration of each of the four analyzer modules 22 to 28, the spatial frequency analyzer 22 acts to analyse the input test video fields/frame and reference video fields/frames and generates pyramid SNR values PySNR(a, b) from a pyramid analysis of the input reference fields/frame and the test field/frame. Additionally, the luminance and chrominance PSNR analyzer 24 compares the input reference field/frame and the input test field/frame to generate luminance and chrominance PSNR values which are then output. Similarly, the edge detector analyzer 26 analyses the input reference field/frame and the input test field/frame and outputs a single edge detector value EDif. Finally, the texture analyzer 26 analyses the test field/frame and the reference field/frame to calculate a parameter TextureDeg indicative of the texture within the present test field/frame, and a parameter TextureRef indicative of the texture within the present reference field/frame. In any event, the operations of each of these spatial frequency analyzer 22, the luminance and chrominance power signal to noise ratio analyzer 24, the edge detector analyzer 26, and the texture analyzer 28 will be described in more detail later.

Referring back to FIG. 1, it will be seen that the output from the respective analysers 22 to 28, are each input to the integration module 4, which acts to integrate the values together to produce the predicted video quality value 10. The operation of the integrator 4 will also be described in detail later.

Referring back to FIG. 2, the operations of each of the individual modules and analysers shown therein will now be described with reference to FIGS. 3 to 10.

Referring first to the spatial frequency analyser 22, the internal configuration of the spatial frequency analyser 22 is illustrated in FIG. 3. Here, it will be seen that the spatial frequency analyser 26 comprises internally a first pyramid transform generator 222 which is arranged to receive as an input the test video fields/frames. Additionally provided is a second pyramid transform generator 224, which receives as an input the reference video fields/frames. The two pyramid transform generators 222 and 224 each operate identically to produce a pyramid array for each input field/frame, which is then fed to a pyramid SNR calculator 226 in order to generate a pyramid SNR measure between respective corresponding test video fields/frames and reference video fields/frames. The operation of the spatial frequency analyser 22 in producing the pyramid SNR measures will be described next with reference to FIGS. 4 to 6.

Referring first to FIG. 5, FIG. 5 is a flow diagram illustrating the steps performed by either of the pyramid transform generators 222 or 224 in producing respective pyramid arrays. Therefore, firstly at step 8.2 the pyramid transform generator receives an input field/frame from the respective sequence (i.e. test sequence or reference sequence). Then, at step 8.4 a counter stage is initialised to zero and a processing loop commenced in order to generate the pyramid array. The general procedure followed to generate the pyramid array is a three stage, two step procedure, wherein for each stage 0 to 2 horizontal analysis is performed followed by vertical analysis. The steps involved in one particular stage of horizontal and vertical analysis are described with respect to steps 8.6 to 8.20 next.

Once within the processing loop commenced at step 8.4, for a particular stage of pyramid processing the first step performed at step 8.6 is that the present field/frame being processed is copied into a temp array, as follows:

$$P\text{Temp}(x,y)=P(x,y) \; x=0 \ldots X-1, y=0 \ldots Y-1 \quad (8\text{-}1)$$

Then, at step 8.8 the horizontal analysis limits are calculated as a function of the present value of the stage parameter as follows:

$$Tx = X/2^{(stage+1)} \quad (8\text{-}2)$$

$$Ty = Y/2^{stage} \quad (8\text{-}3)$$

Next, horizontal analysis is performed within the calculated limits, such that averages and differences of horizontal pairs of elements of the temporary array are used to update the pyramid array according to:

$$P(x,y)=0.5*(P\text{Temp}(2x,y)+P\text{Temp}(2x+1,y)) \; x=0 \ldots Tx-1, y=0 \ldots Ty-1 \quad (8\text{-}4)$$

$$P(x+Tx,y)=P\text{Temp}(2x,y)-P\text{Temp}(2x+1,y) \; x=0 \ldots Tx-1 \; y=0 \ldots Yy-1 \quad (8\text{-}5)$$

and at step 8.12 the input field/frame values are overwritten with the results of the horizontal analysis.

Vertical analysis for the present stage of processing is then performed, commencing at step 8.14 wherein the input field/frame is again copied into the temp array. However, at this point it should be noted that the values within the input field/frame were overwritten at step 8.12 with the results of the horizontal analysis, and hence it will be seen that the input to the present stage of vertical analysis is the output from the immediately preceding present stage of horizontal analysis.

Next, at step 8.16 the vertical analysis limits are calculated as a function of the stage value, as follows $$Tx = X/2^{stage} \quad (8\text{-}6)$$

$$Ty = Y/2^{(stage+1)} \quad (8\text{-}7)$$

Following which vertical analysis is performed within the calculated limits according to the following, at step 8.18 so that averages and differences of vertical pairs of elements of the temporary array are used to update the pyramid array according to:

$$P(x,y)=0.5*(P\text{Temp}(x,2y)+P\text{Temp}(x,2y+1)) \; x=0 \ldots Tx-1, y=0 \ldots Ty-1 \quad (8\text{-}8)$$

$$P(x,y+Ty)=P\text{Temp}(x,2y)-P\text{Temp}(x,2y+1) \; x=0 \ldots Tx-1 \; y=0 \ldots Ty-1 \quad (8\text{-}9)$$

At step 8.20 the input field/frame is overwritten with the results of the vertical analysis performed at step 8.18 such that the values within the input field/frame array correspond to the results of the first stage of the spatial analysis. At step 8.22 an evaluation is performed to determine whether each of the stages of the spatial analysis to generate the pyramid array have been performed, and if not processing returns back to step 8.4, wherein the stage value is incremented, and the steps of 8.6 to 8.20 repeated once again. It should be noted that for each step of horizontal and vertical analysis at each stage, the values within the input field/frame array are overwritten with the calculated vertical and horizontal limits, such that as processing proceeds step by step through each stage, the values held within the input field/frame array are converted into a pyramid structure each of four quadrants at each level. Thus, by the time each of the stages 0 to 2 has been completed, such that the evaluation at step 8.22 causes the processing loop to end, a pyramid array has been constructed which can be output at step 8.24.

Figure 7:
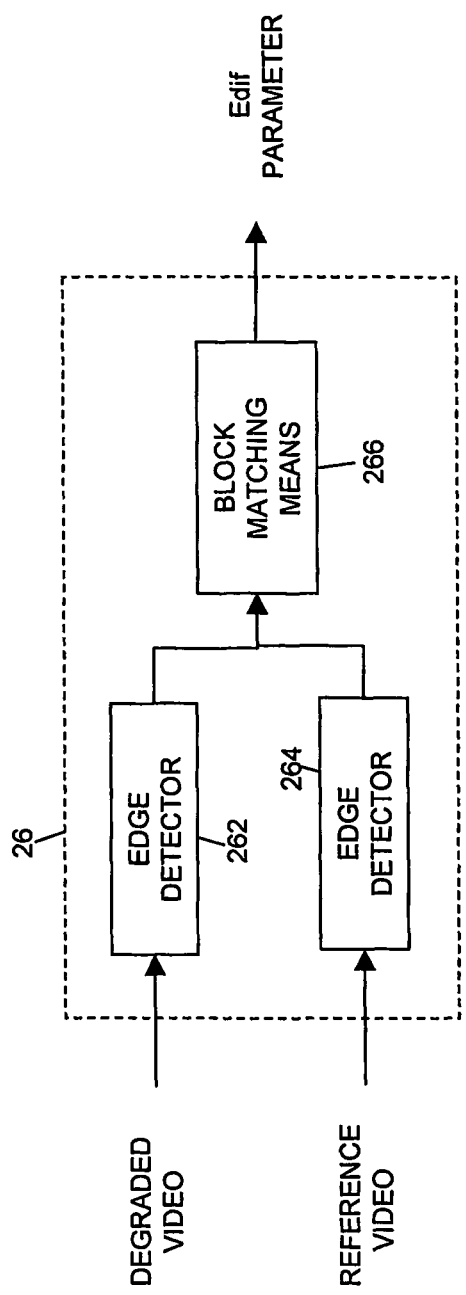
FIG. 7 is a block diagram illustrating the edge analyser of the embodiment of the invention.

The format of the constructed pyramid array at the end of each processing stage is shown in FIG. 7. More particularly, FIG. 7(*a*) illustrates the contents of the input field/frame array after the end of the stage 0 processing whereupon it will be seen that the horizontal analysis step followed by the vertical analysis step causes the array to be split into four quadrants Q(stage, 0 to 3) wherein Q(0, 0) contains values corresponding to the average of blocks of 4 pixels of the input field/frame, Q(0, 1) contains values corresponding to the horizontal difference of blocks of 4 pixels of the input field/frame, Q(0, 2) contains values corresponding to the vertical difference of blocks of 4 pixels, and Q(0, 3) contains values corresponding to the diagonal difference of blocks of 4 pixels.

The quadrant Q(0,0) output from the stage 0 analysis as shown in FIG. 7(*a*) is then used as the input to the second iteration of the FOR loop to perform the stage one processing, the results of which are shown in FIG. 7(*b*). Here it will be seen that the quadrant Q(0, 0) has been overwritten by results Q(1, 0 to 3) which relate to the analysis of 4 by 4 pixel blocks, but wherein each quadrant Q(1, 0 to 3) contains values relating to the average, horizontal difference, vertical difference, and diagonal difference as previously described in respect of the stage 0 output.

Figure 8:
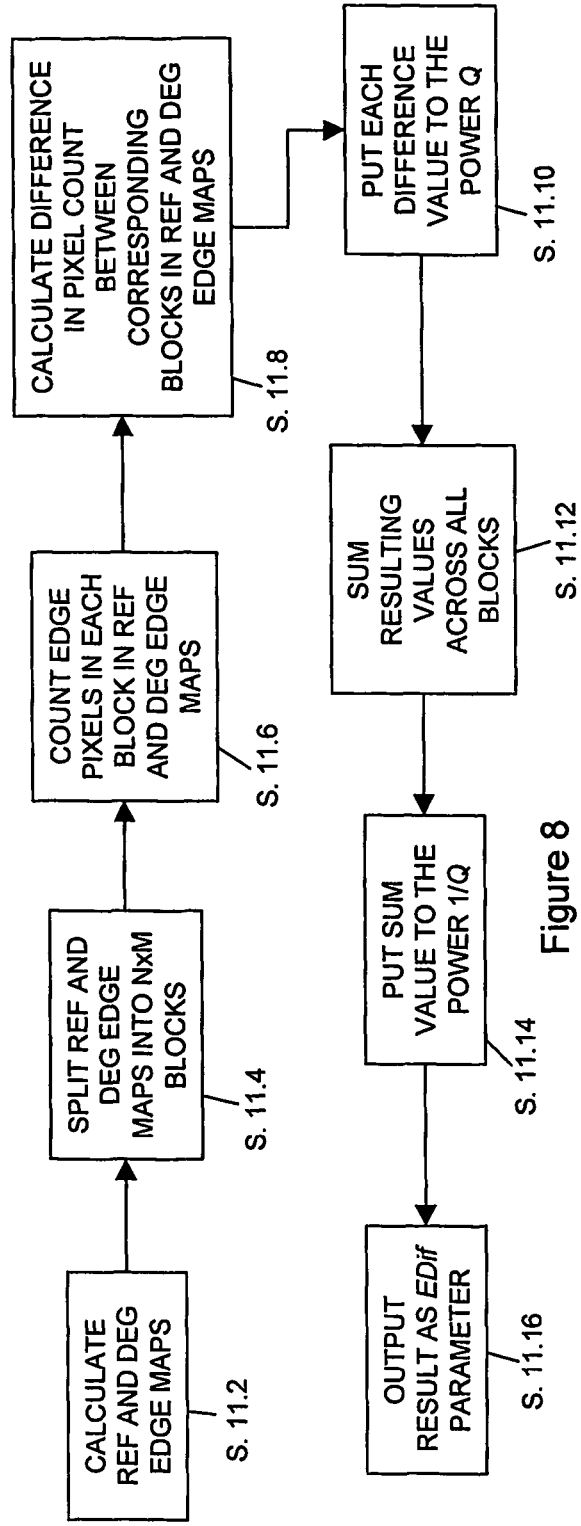
FIG. 8 is a flow diagram illustrating the operation of the edge analyser of the embodiment of the invention.

The output of the stage 1 analysis as shown in FIG. 7(*b*) is used as the input to the stage 2 analysis in the third iteration of the FOR loop of FIG. 8, to give the results shown in FIG. 7(*c*), where it will be seen that the quadrant Q(1, 0) has been overwritten by the quadrants Q(2, 0 to 3), where each of the quadrants Q(2, 0 to 3) relates to the average of blocks, horizontal difference of blocks, etc. respectively as described previously. After the three stages of analysis, the resulting pyramid array as shown in FIG. 7(*c*) has a total of ten blocks of results, being three blocks Q(0, 1 to 3) from the stage 0 (2 by 2 pixel) analysis, three quadrants Q(1, 1 to 3) from the stage 1 (4 by 4 pixel) analysis, and four quadrants Q(2, 0 to 3) from the stage 2 (8×8 pixel) analysis. It should be noted that the procedure of FIG. 8 to produce the pyramid arrays as shown in FIG. 7 is performed by each of the pyramid transform generators 222 and 224 to produce respective pyramid arrays pref and pdeg which are then input to the SNR calculator 226. The operation of the pyramid SNR calculator 226 is shown in FIG. 6.

Figure 6:
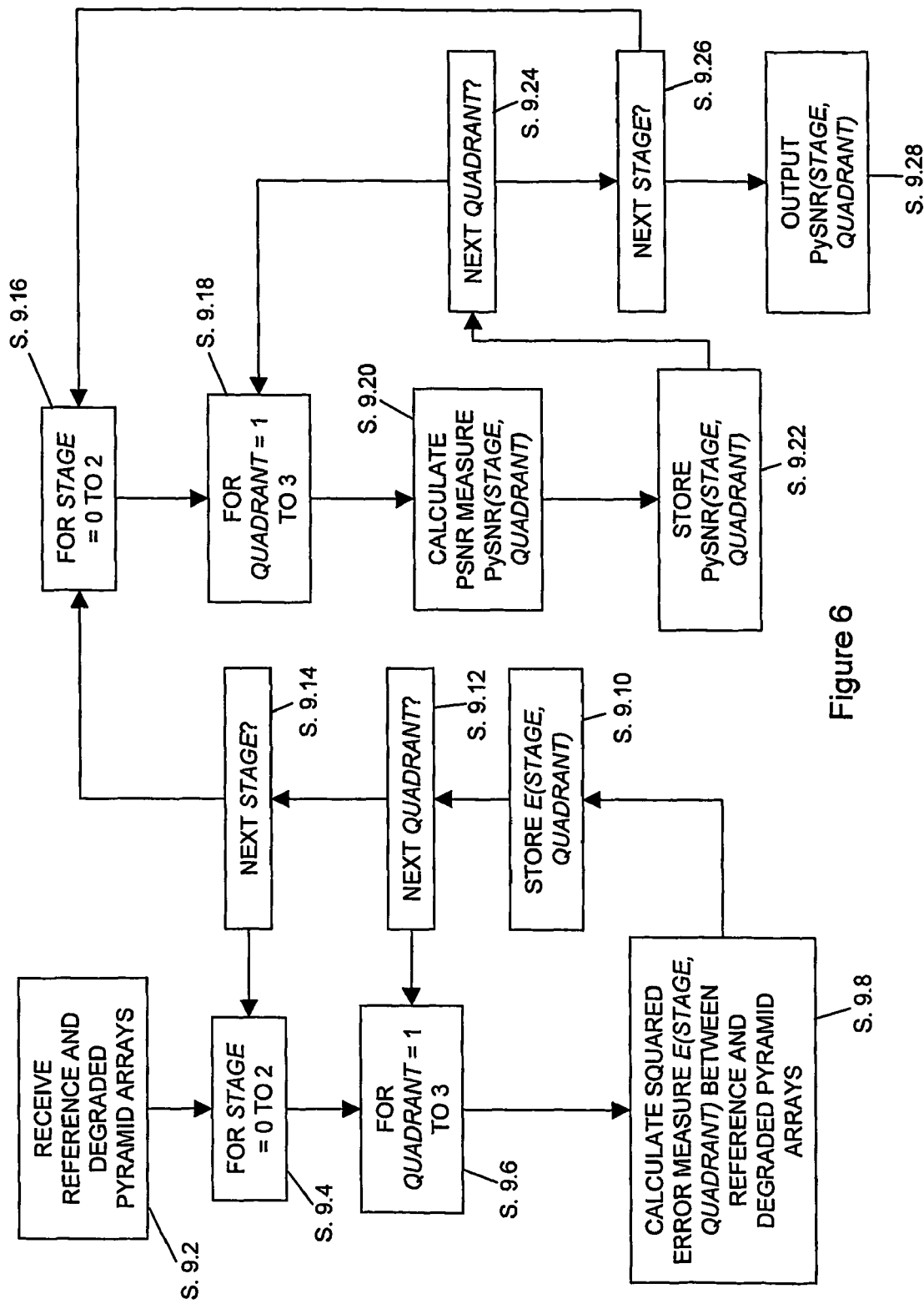
FIG. 6 is a flow diagram illustrating the calculation of a pyramid SNR value in the embodiment of the invention.

With reference to FIG. 6, firstly at step 9.2 the pyramid SNR calculator 226 receives the reference and degraded pyramid arrays from the pyramid transform generators 224 and 222 respectively. Next, at step 9.4 a processing loop is commenced which processes each value of the counter value stage from 0 to 2. Following this, a second, nested, processing loop which processes a counter value quadrant between values of 1 to 3 is commenced at step 9.6. Within these nested processing loops at step 9.8 a squared error measure value E(stage, quadrant) is calculated between the reference and pyramid arrays, according to:

$$E(s, q) = \quad (9\text{-}1)$$

$$(1/XY^2) \sum_{x=x1(s,q)}^{x2(s,q)} \sum_{y=y1(s,q)}^{y2(s,q)} (P\,ref(x, y) - P\,deg(x, y))^2$$

$$s = 0 \ldots 2$$

$$q = 1 \ldots 3$$

where x1, x2, y1 and y2 define the horizontal and vertical limits of the quadrants within the pyramid arrays and are calculated according to:

$$x1(s,1)=X/2^{(s+1)} \; x2(s,1)=2*x1(s,1) \; y1(s,1)=0 \; y2(s,1) = Y/2^{(s+1)} \quad (9\text{-}2)$$

$$x1(s,2)=0 \ x2(s,2)=X/2^{(s+1)} y1(s,2)=Y/2^{(s+1)} y2(s,2)$$
$$=2*y1(s,2) \quad (9\text{-}3)$$

$$x1(s,3)=X/2^{(s+1)} x2(s,3)=2*x1(s,3) y1(s,3)=Y/2^{(s+1)}$$
$$y2(s,3)=2*y1(s,3) \quad (9\text{-}4)$$

Each calculated error measure E(stage, quadrant) is then stored at step 9.10, following which at steps 9.12 and 9.14 the values of the quadrant and stage counters are updated as appropriate to the processing loops. The operation of the processing loops of step 9.4 to 9.14 and step 9.6 to step 9.12 is to calculate an error measure value for each value of the counter stage and the counter quadrant.

Having calculated the squared error measure values, at step 9.16 a further processing loop to process all the available values of the counter stage from 0 to 2 is commenced, following which at step 9.18 a nested processing loop to process the values of the quadrant counter 1 to 3 is commenced. Within these nested processing loops at step 9.20 a PSNR measure PySNR(stage, quadrant) is calculated according to:

$$\text{if } (E>0.0) \ PySNR(s,q)=10.0*\log_{10}(2552/E(s,q)) \text{ else}$$
$$SNR=10.0*\log_{10}(255^2*XY^2) \quad (9\text{-}5)$$

which is then stored at step 9.22: At steps 9.24 and subsequent step 9.26 the values of the counters stage and quadrant are incremented as appropriate to the processing loops, such that the effect of the nested processing loops is to calculate and store the PSNR measure for each value of stage and each value of quadrant. Given that the parameter stage can take values of 0 to 2, and the parameter quadrant may take values of 1 to 3, it will be seen that a total of 9 PSNR measures are generated by the pyramid SNR calculator 226, all of which may be output to the integration stage 4.

The operation of the edge analyser 26 will now be described with respect to FIGS. 7 and 8.

FIG. 7 illustrates the internal configuration of the edge analyser 26. More particularly, the edge analyser 26 comprises a first edge detector 262 arranged to receive and test the video fields/frames, and to detect edges therein, and a second edge detector 264 arranged to receive the reference video fields/frames output from the matching module 30, and to detect edges therein. Both the edge detectors 262 and 264 preferably operate in accordance with known edge detection algorithms and produce edge maps in a manner already known in the art. For example, examples of known edge detection algorithms are Laplacian edge detectors, Canny edge detectors, and Rothwell edge detectors. Source code in the C programming language for a Canny edge detector was available for free download via ftp before the priority date from figment.csee.usf.edu/pub/Edge_Comparison/source-code/canny.serc whereas source code in C for a Rothwell edge detector was available from figment.csee.usf.edu/pub/Edge_Comparison/sourcecode/canny.serc.

The respective edge maps produced by each of the edge detectors 262 and 264 are input to a block matching means 266 which acts to compare the respective edge maps in a manner to be described, and to produce an output parameter EDif, representative of the comparison. The operation of the edge analyser 26 is shown in more detail in FIG. 8.

With reference to FIG. 8, firstly, at step 11.2 the respective edge detectors 262 and 264 calculate respective reference and degraded edge maps. As mentioned above, the edge detection algorithm used by the edge detectors 262 and 264 is preferably one which is known in the art, such as a Canny edge detector. The edge detectors 262 and 264 output the reference and degraded edge maps to the block matching means 266, wherein at step 11.4 each of the reference and degraded edge maps are split into n by m blocks. Next, the block matching means 266 acts to count each pixel which forms part of an edge within each block in both of the reference and the degraded edge maps. Thus, after step 11.6 the block matching means 266 has obtained a count of edge pixels for each block in each of the reference and degraded edge maps.

Following the counting step, at step 11.8 the block matching means 266 calculates the difference in respective pixel counts between corresponding blocks in the reference and the degraded edge maps. Therefore, after step 11.8 as many difference values as there are blocks in one of the reference or degraded edge maps will have been obtained.

Following step 11.8, at step 11.10 the block matching means 266 puts each difference value to the power Q and at step 11.12 the resulting values are summed. Therefore, after step 11.10 there are still as many values as there are blocks in one of the reference or degraded edge maps, but after step 11.12 a single result is obtained corresponding to a sum of the values calculated at step 11.10. At step 11.14, the resulting sum value is then put to the power 1/Q, and at step 11.16 the result of this calculation is output from the block matching means 266 as the EDif parameter. As will be seen from FIG. 2, the EDif parameter is output from the edge analyser 26 to the integration stage 4. Use of the EDif parameter within the integration stage will be described later.

It may be useful in some situations to take into account analysis offsets from the field/frame edges in the edge differencing steps of 11.6 to 11.16, in which case the processing then becomes as follows.

After producing the respective edge maps, the block matching means then calculates a measure of the number of edge-marked pixels in each analysis block, where nX and nY define the number of non-overlapping blocks to be analysed in the horizontal and vertical directions and X1 and Y1 define analysis offsets from the field edge.

$$Bref(x, y) = \quad (11\text{-}1)$$
$$\sum_{i=i1}^{i2} \sum_{j=j1}^{j2} EMapRef(Nx + X1 + i, My + Y1 + j)$$
$$x = 0 \ldots nX - 1, \quad y = 0 \ldots nY - 1$$

$$BDeg(x, y) = \quad (11\text{-}2)$$
$$\sum_{i=i1}^{i2} \sum_{j=j1}^{j2} EMapDeg(Nx + X1 + i, My + Y1 + j)$$
$$x = 0 \ldots nX - 1, \quad y = 0 \ldots nY - 1$$

The summation limits are determined according to:

$$i1=-(N \text{ div } 2) \ i2=(N-1) \text{ div } 2 \quad (11\text{-}3)$$

$$j1=-(M \text{ div } 2) \ j2=(M-1) \text{ div } 2 \quad (11\text{-}4)$$

where the "div" operator represents an integer division.

Then, a measure of the differences over the whole field is calculated according to:

$$EDif = (1/N * M * nX * nY) * \quad (11\text{-}5)$$
$$\left( \sum_{x=0}^{nX-1} \sum_{y=0}^{nY-1} (BRef(x, y) - BDeg(x, y))^Q \right)^{1/Q}$$

For 720×288 pixel fields for 625 broadcast video:

$$N=4, X1=6, nX=178, M=4, Y1=10, nY=69 \quad (11\text{-}6)$$

Whereas for 720×243 pixel fields for 525 broadcast video:

$$N=4, X1=6, nX=178, M=4, Y1=10, nY=58 \quad (11\text{-}7)$$

It should be noted that the above processing represented by equations 11-1 to 11-7 is substantially identical with that already described in respect of FIG. 8, with the differences that the analysis offsets from the field/frame edges are taken into account. The parameter Edif found by equation 11-5 is output to the integration stage 4 in the same manner as previously described.

The operation of the texture analyser 28 will now be described with respect to FIG. 9.

Digital video compression tends to reduce the texture or detail within the an image by the quantisation of the DCT coefficients used within the coding process. Texture analysis can therefore yield important information on such compression, and is used within the present embodiment to provide a video characteristic value TextureDeg and TextureRef. More particularly, the texture parameter values TextureDeg and TextureRef are measured by recording the number of turning points in the intensity signal along horizontal picture lines. This is performed as shown in FIG. 9.

Figure 9:
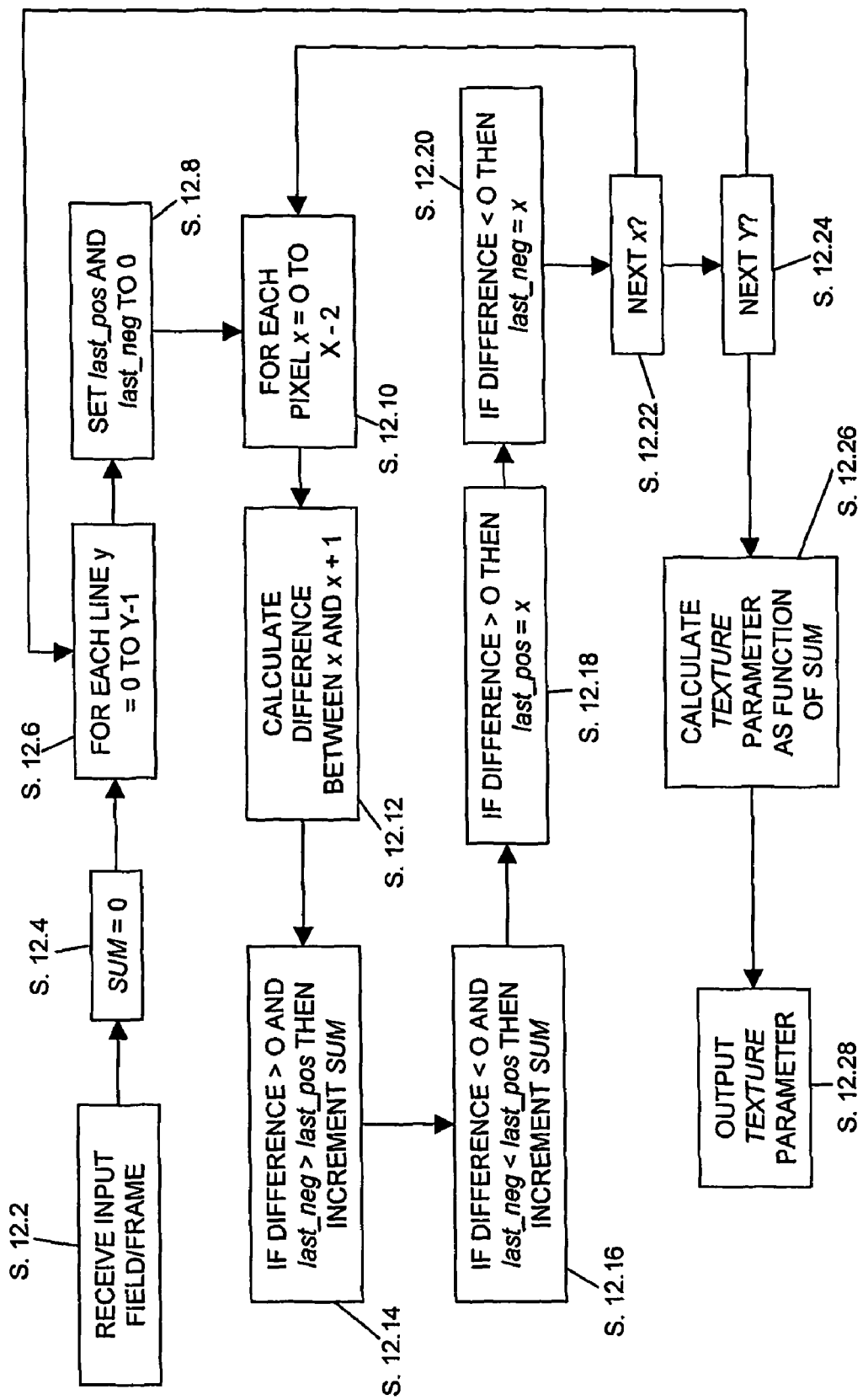
FIG. 9 is a flow diagram illustrating the operation of the texture analyser of the embodiment of the invention.
Figure 10:
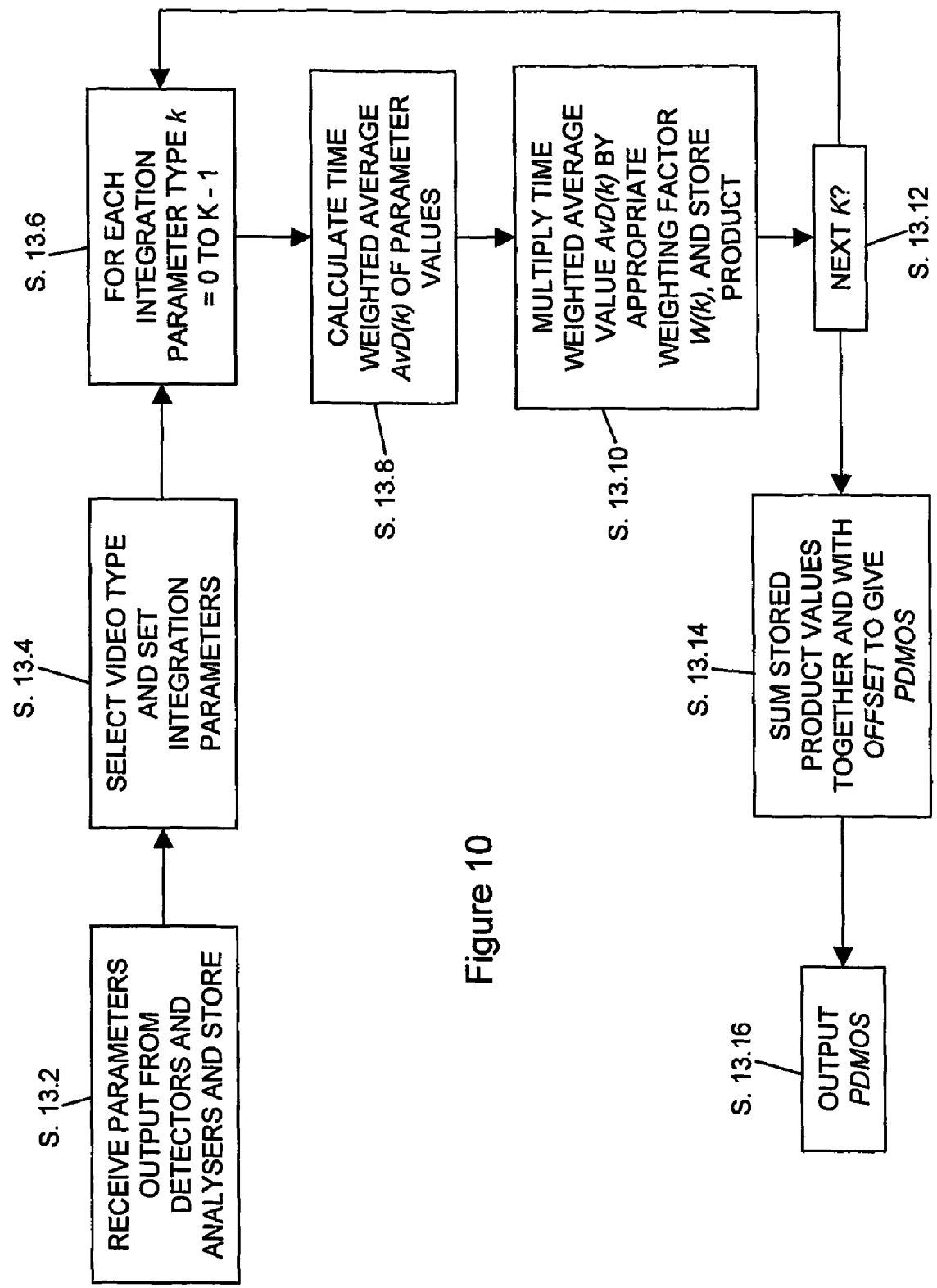
FIG. 10 is a flow diagram illustrating the operation of the integrator stage of the embodiment of the invention.

With reference to FIG. 9, firstly at step 12.2 the texture analyser 28 receives the present test field/frame to be processed. From FIG. 2 it will be recalled that the texture analyser 28 receives the test video field/frame, and the original reference field/frame. However, in other embodiments the texture analyser 28 may receive only one of the reference field/frame or the test field/frame in which case only one TextureDeg or TextureRef parameter is calculated as appropriate.

Following step 12.2, at step 12.4 a turning point counter sum is initialised to zero. Then, at step 12.6 a processing loop is commenced for each line within the input video field/frame loop within the limits loop=0 to Y−1, wherein Y is the number of lines within the video field/frame. Within the processing loop, at step 12.18 values last_pos, and last_neg are both initialised to 0. Next, at step 12.10 a second, nested, processing loop is commenced to process each pixel x within each line y, where x takes the value of 0 to X−2, wherein X is the number of pixels in a line of the input video field/frame.

Within the nested processing loop, at step 12.12 a difference value is calculated between the pixel value at position x, and the pixel value at position x+1. Then, at step 12.14 an evaluation is performed to determine whether or not the calculated difference value is greater than 0, and also as to whether or not the value last_neg is greater than the value last_pos. If this logical condition is met then the counter value sum is incremented. Following step 12.14, at step 12.16 a second evaluation is performed to determine whether or not the difference value calculated at step 12.12 is less than 0, and as to whether or not the value last_neg is less than the value last_pos. If this is the case then the counter value sum is incremented. It will be noted that the evaluations of step 12.14 and step 12.16 are mutually exclusive, and that it is not possible for the counter value sum to be incremented twice for any single particular pixel. After step 12.16, at step 12.18 a further evaluation is determined as to whether or not the calculated difference value is greater than zero, in which case the value last_pos is set to be the number of the current pixel x. Alternatively, at step 12.20 a second evaluation is performed which evaluates as to whether or not the calculated difference value is less than zero, in which case the counter value last_neg is set to be the current pixel number x.

Following step 12.20, at step 12.22 an evaluation is performed to determine whether or not all of the pixels x within the present line have been processed, and if not then processing proceeds back to step 12.10 wherein the next pixel is processed. However, if all of the pixels have been processed then processing proceeds to step 12.24, wherein an evaluation is made to determine whether or not all of the lines y have been processed in the present input frame, and if not then processing proceeds back to step 12.6, when processing of the next line is commenced. The results of these nested processing loops are that each pixel on each line is processed, and whenever the evaluations of steps 12.14 and steps 12.16 return true the counter sum is incremented. Therefore, after the processing loops have finished, the counter sum will contain a certain value which is indicative of the texture turning points within the input field/frame.

Using this value held within the counter sum, at step 12.26 a texture parameter is calculated as a function of the value held in the counter sum, as follows:

$$\text{Texture}=\text{sum}*100/XY \quad (12\text{-}1)$$

The texture parameter thus calculated may be output from the texture analyser 28 to the integrator stage 4 at step 12.28.

The operation of the luminance and chrominance power signal to noise ratio analyser 24 will now be described.

As shown in FIG. 2, the luminance and chrominance power signal to noise ratio analyser 24 receives the matched reference video fields/frames and the degraded video fields/frames as inputs. These can then be used in the intensity and colour signals to noise ratio measures according to the following, where RefY and DegY are fields of reference and degraded intensity and RefU, DegU, RefV and DegV are fields of chrominance according to YUV standard colour format:

$$YPSNR = 10.0 * \log_{10}\left(255^2 * XY \bigg/ \left(\sum_{x=0}^{X-1}\sum_{y=0}^{Y-1}(RefY(x,y)-DegY(x,y))^2\right)\right) \quad (2\text{-}1)$$

$$UPSNR = 10.0 * \log_{10}\left(255^2 * XY \bigg/ \left(\sum_{x=0}^{X-1}\sum_{y=0}^{Y-1}(RefU(x,y)-DegU(x,y))^2\right)\right) \quad (2\text{-}2)$$

$$VPSNR = 10.0 * \log_{10}\left(255^2 * XY \bigg/ \left(\sum_{x=0}^{X-1}\sum_{y=0}^{Y-1}(RefV(x,y)-DegV(x,y))^2\right)\right) \quad (2\text{-}3)$$

Of course, in other embodiments of the invention which do not use the YUV colour model, such as RGB, and YCbCr, then of course similar corresponding measurements may be calculated as will be apparent to those skilled in the art.

Returning to FIG. 1, the various outputs from the matching module and analysers within detector module 2 are fed to an integration stage 4, wherein the various values are integrated together to give a video quality value 10. The operation of the integration stage 4 will now be described with respect to FIG. 10.

Generally, the operation of the integration stage is to produce an estimate of the perceived video quality of the test video sequence by the appropriate weighting of a selection of the video characteristic parameter values produced by the analysers 22 to 28. The particular set of parameter values used and the values of the corresponding weighting factors depend upon the particular type of video being tested, and are determined in advance by prior calibration. The calibrations are performed on a large set of video sequences that have known subjective scores, and preferably have properties similar to the degraded sequences to be tested.

The general form of the integration procedure firstly time weights the field/frame by field/frame detection parameters, and then combines the time-weighted and averaged values to give a predicted quality score, being the overall video quality value. The process to achieve this is set out in FIG. 10.

Firstly, the integration stage 4 receives the parameter values output from the various detectors and analysers at step 13.2 and stores them. As has been described previously, the spatial frequency analyser 22 outputs the PySNR values, while the luminance and chrominance power signal to noise ratio analyser 24 outputs PSNR values for each of the luminance and chrominance characteristics in the colour model being used. Moreover, the edge analyser 26 outputs at the EDif parameter as described previously, whereas the texture analyser 28 gives the values TextureDeg at least, but might also output values TextureRef and TextureMref if appropriate. Whatever parameters and values have been output by each of the earlier stages in respect of a particular test video field/frame, the integration stage receives the output information and stores it.

Next, at step 13.4 the integration stage selects the video type, and as a result selects a set of integration parameters in dependence on the video type. For example, a set of integration parameters for 720 by 288 pixel per field 625 broadcast video that has been MPEG encoded at between 1 Mbits per second and 5 Mbits per second, and that may be determined by prior calibration is given below:

N=400, K=6, Offset=176.486         (4-1)

TABLE 1

Integration parameters for 625 broadcast video.

| K | Parameter name | W | Mnk |
|---|---|---|---|
| 0 | TextDeg | −0.68 | 1.0 |
| 1 | PySnr(3,3) | −0.57 | 1.0 |
| 2 | Edif | 58913.294 | 1.0 |
| 3 | YPSNR | −0.928 | 1.0 |

Whereas the weighting values for 525 line video are:

TABLE 2

Integration parameters for 525 broadcast video.

| K | Parameter name | W |
|---|---|---|
| 0 | TextureDeg | +0.043 |
| 1 | PySNR(3,3) | −2.118 |
| 2 | EDif | +60865.164 |
| Offset | | +260.773 |
| N | | 480 |

The precise values of the various weighting factors are determined in advance by calibration, as described. Moreover, each set of integration parameters is stored within the integration stage 4 in look-up tables or the like.

Having selected the video type and set the integration parameters from the stored look-up tables, at step 13.6 a processing loop is commenced in order to process each integration parameter type k within the values 0 to K−1, wherein each parameter (k) is a particular one of the parameters received from the various analysers or the matching module.

Within the processing loop, at step 13.8 firstly a time weighted average AvD(k) of the parameter values is calculated according to the following:

$$AvD(k) = (1/N) * \left( \sum_{n=0}^{N-1} D(k,n)^{mnk} \right)^{1/mnk} \quad (13\text{-}1)$$

where n is the number of fields, D(k, n) is the n'th field of the kth detection parameter, and mnk is a "minkowski" weighting factor. Next, at step 13.10 the time weighted average value AvD(k) is multiplied by the appropriate weighting factor w(k), and the product stored. The appropriate weighting factor w(k) is read from the appropriate look up table for the video type stored in the integration stage 4.

At step 13.12 an evaluation is performed to determine whether or not all of the integration parameters (k) have been processed, and if not the processing loop of step 13.6 is performed again until all of the parameters have been processed. Once all the parameters have been processed then an appropriately weighted time weighted average value will be available for each type of parameter k, which are then summed together at step 13.14 with an offset value as follows:

$$PDMOS = \text{Offset} + \sum_{k=0}^{K-1} AvD(k) * W(k) \quad (13\text{-}2)$$

to give a final video quality value PDMOS, which is then output at step 13.16.

The output video quality value PDMOS may be put to a number of uses. In particular, it may be used to evaluate the quality of an existing video service to ensure that the quality is adequate, or alternatively it may be used to test the performance of different video codecs. Additionally, the video quality value may be used to evaluate the performance of new video services, such as broadband-style video services over the Internet.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

Moreover, for the avoidance of doubt, where reference has been given to a prior art document or disclosure, whose contents, whether as a whole or in part thereof, are necessary for the understanding of the operation or implementation of any of the embodiments of the present invention by the intended reader, being a man skilled in the art, then said contents should be taken as being incorporated herein by said reference thereto.

Figure 11:
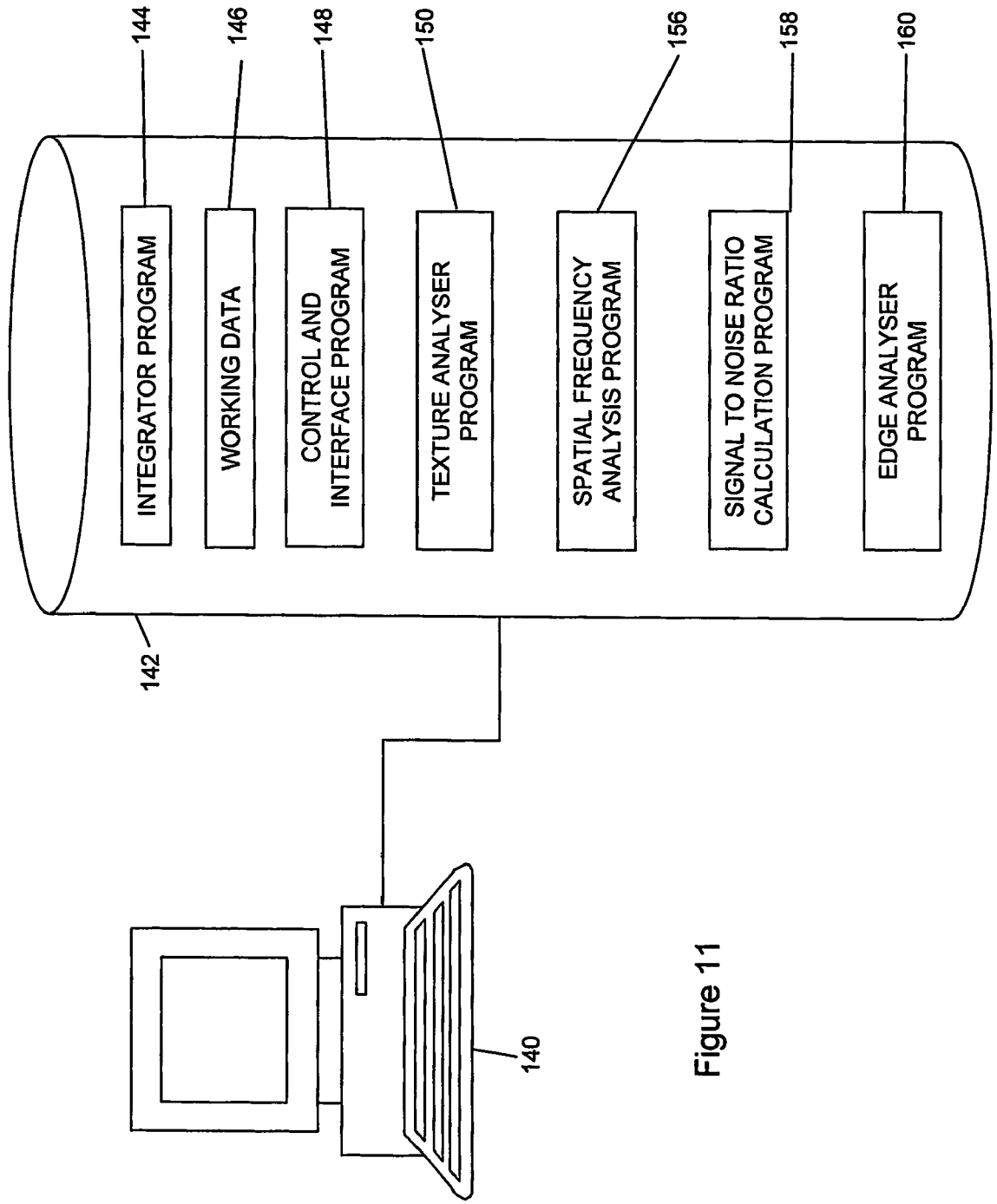
FIG. 11 is a block diagram of a programmed general purpose computer suitable for an implementation of an exemplary embodiment.

The general purpose computer 140 shown in FIG. 11 includes a CPU having access to program memory store 142. Executable computer program modules 144, 148, 150, 156, 158 and 160 in store 142, when executed, provide previously discussed integrator, control and interface, texture analyzer, spatial frequency analysis, signal-to-noise ratio calculation and edge analyzer functions. Working data section 146 is also available in memory 142. Conventional input/output ports are also provided (e.g., keyboard, visual display and removable memory medium port as depicted in FIG. 11).

What is claimed is:

1. A computer-implemented video quality assessment method comprising using a computer:
   generate respective edge maps for a reference video field/frame and a test video/frame;
   generate data relating to (i) edges contained within the respective edge maps and (ii) edges contained within corresponding sub-field/frame elements of the respective edge maps;
   count edge pixels within the sub-elements of the test and reference fields/frames;
   determine respective difference values between respective counts of corresponding sub-field/frame elements in the test and reference fields/frames;
   generate an edge parameter value in dependence on each of the difference values; and
   use the edge parameter values to produce a video quality measurement value.

2. A method according to claim 1, wherein the use of the generated edge parameter value data further comprises integrating the edge parameter value with other parameter values derived from at least one of a spatial analysis, a temporal analysis and a texture analysis to give the video quality value.

3. A method according to claim 2, wherein the integrating step comprises weighting the parameter values in accordance with pre-determined weighting values, and summing the weighted values, wherein the resulting sum is the video quality value.

4. A non-transitory computer-readable medium containing executable computer program code which, when executed by a computer system, causes the system to perform the process of claim 1.

5. A video quality assessment system comprising:
   edge map generating means arranged in use to generate respective edge maps for a reference video field/frame and a test video/frame;
   edge map analysis means arranged in use to generate data relating to (i) edges contained within the respective edge maps and (ii) edges contained within corresponding sub-field/frame elements of the respective edge maps;
   counting means for counting edge pixels within the sub-elements of the test and reference fields/frames;
   difference means for determining respective difference values between respective counts of corresponding sub-field/frame elements in the test and reference fields/frames;
   parameter calculation means for calculating an edge parameter value in dependence on each of the difference values; and
   video quality value determining means arranged in use to use the generated edge parameter values to produce a video quality measurement value.

6. A system according to claim 5, further comprising:
   one or more further analyzing means respectively arranged in use to analyze the reference and test video fields/frames and to produce respective analysis parameter values relating to the results of the respective analyses;
   wherein the video quality value determining means further comprises integration means for integrating the edge parameter value with the other parameter values derived from the further analysis means, to give the video quality value.

7. A system according to claim 6, wherein the integration means comprises weighting means for weighting the parameter values in accordance with predetermined weighting values, and a summer for summing the weighted values, wherein the resulting sum is the video quality value.

* * * * *